(12) United States Patent
Tsunashima

(10) Patent No.: US 11,263,769 B2
(45) Date of Patent: Mar. 1, 2022

(54) IMAGE PROCESSING DEVICE, IMAGE PROCESSING METHOD, AND IMAGE PROCESSING SYSTEM

(71) Applicant: SONY CORPORATION, Tokyo (JP)

(72) Inventor: Nobuhiro Tsunashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/559,979

(22) PCT Filed: Feb. 17, 2016

(86) PCT No.: PCT/JP2016/054553
§ 371 (c)(1),
(2) Date: Sep. 20, 2017

(87) PCT Pub. No.: WO2016/167017
PCT Pub. Date: Oct. 20, 2016

(65) Prior Publication Data
US 2018/0108144 A1   Apr. 19, 2018

(30) Foreign Application Priority Data

Apr. 14, 2015   (JP) ............................. JP2015-082273

(51) Int. Cl.
*G06T 7/70* (2017.01)
*G06T 7/11* (2017.01)
(Continued)

(52) U.S. Cl.
CPC ................. *G06T 7/70* (2017.01); *G06T 7/11* (2017.01); *H04N 5/225* (2013.01);
(Continued)

(58) Field of Classification Search
CPC .... G06K 9/00765; G06K 9/78; G06K 9/2054; G06K 9/00771; G06K 2209/21;
(Continued)

(56) References Cited

U.S. PATENT DOCUMENTS

2004/0190025 A1   9/2004   Nomura et al.
2009/0263021 A1*  10/2009  Takamori ........... G06K 9/00771
                                                         382/181
(Continued)

FOREIGN PATENT DOCUMENTS

JP   2001-333422 A   11/2001
JP   2004-289516 A   10/2004
(Continued)

OTHER PUBLICATIONS

International Search Report dated May 17, 2016 in PCT/JP2016/054553 filed Feb. 17, 2016.

*Primary Examiner* — John W Lee
(74) *Attorney, Agent, or Firm* — Oblon, McClelland, Maier & Neustadt, L.L.P.

(57) ABSTRACT

The present disclosure provides an image processing device, image processing method, and image processing system that are capable of freely deciding a position of a cutout region when cutting out an image from an original image. The image processing device includes an object detection unit configured to detect an object in a first image, and a cutout region deciding unit configured to decide, as a cutout region, a region positioned in a relative direction based on a position at which the object is detected in the first image, the relative direction varying depending on a detection condition.

15 Claims, 18 Drawing Sheets

(51) Int. Cl.
  *H04N 5/232* (2006.01)
  *H04N 7/18* (2006.01)
  *H04N 5/225* (2006.01)

(52) U.S. Cl.
  CPC ..... *H04N 5/23206* (2013.01); *H04N 5/23218* (2018.08); *H04N 5/232945* (2018.08); *H04N 7/18* (2013.01); *G06T 2207/30196* (2013.01); *G06T 2207/30248* (2013.01)

(58) Field of Classification Search
  CPC .......... H04N 5/225; H04N 7/18; H04N 5/232; G06T 7/70; G06T 7/11; G06T 2207/30248; G06T 2207/30196
  See application file for complete search history.

(56) References Cited

U.S. PATENT DOCUMENTS

| | | | |
|---|---|---|---|
| 2010/0074557 A1 | 3/2010 | Oku et al. | |
| 2010/0119177 A1* | 5/2010 | Suzuki | H04N 7/188 382/307 |
| 2010/0158398 A1* | 6/2010 | Noguchi | H04N 19/33 382/232 |
| 2011/0007175 A1* | 1/2011 | Fujita | H04N 5/23287 348/222.1 |
| 2011/0310237 A1* | 12/2011 | Wang | H04N 7/18 348/77 |
| 2012/0127329 A1* | 5/2012 | Voss | H04N 5/23254 348/208.4 |
| 2014/0002742 A1* | 1/2014 | Chamaret | H04N 5/14 348/571 |
| 2014/0003713 A1* | 1/2014 | Seow | G06T 7/11 382/164 |
| 2015/0161447 A1* | 6/2015 | Fu | G06K 9/00369 382/103 |
| 2018/0121736 A1* | 5/2018 | Tsunashima | H04N 7/18 |

FOREIGN PATENT DOCUMENTS

| | | |
|---|---|---|
| JP | 2005-175684 A | 6/2005 |
| JP | 2005-184266 A | 7/2005 |
| JP | 2006-345134 A | 12/2006 |
| JP | 2008-288797 A | 11/2008 |
| JP | 2010-103972 A | 5/2010 |
| WO | WO 2011065960 A1 | 6/2011 |
| WO | WO 2014/097536 A1 | 6/2014 |

* cited by examiner

IMAGE PROCESSING DEVICE, IMAGE PROCESSING METHOD, AND IMAGE PROCESSING SYSTEM

TECHNICAL FIELD

The present disclosure relates to image processing devices, image processing methods, and image processing systems.

BACKGROUND ART

Conventionally, various kinds of technologies for cutting out a region of a detection target object such as a person from a captured image have been developed.

For example, Patent Literature 1 describes a technology for detecting moving objects in an image captured by a camera with a fisheye lens and cutting out a circumscribed quadrangle region of each of the detected moving objects. In addition, Patent Literature 2 describes a technology for calculating a central position of a cutout region in a captured image on the basis of a position at which a remarkable point of a target object is detected in the captured image and a previously-stored distance and direction from the remarkable point to a cutout position.

CITATION LIST

Patent Literature

Patent Literature 1: JP 2001-333422A
Patent Literature 2: JP 2005-184266A

DISCLOSURE OF INVENTION

Technical Problem

However, when using the technology described in Patent Literature 1 or Patent Literature 2, the position of the cutout region cut out from the original image is limited. For example, in the case where positions at which remarkable points are detected are the same, positions of cutout regions are the same according to the technology described in Patent Literature 2 even if cutout target objects are different from each other.

Accordingly, the present disclosure proposes a novel and improved image processing device, image processing method, and image processing system that are capable of freely deciding a position of a cutout region when cutting out an image from an original image.

Solution to Problem

According to the present disclosure, there is provided an image processing device including: an object detection unit configured to detect an object in a first image; and a cutout region deciding unit configured to decide, as a cutout region, a region positioned in a relative direction based on a position at which the object is detected in the first image, the relative direction varying depending on a detection condition.

In addition, according to the present disclosure, there is provided an image processing method including: detecting an object in a first image; and deciding, as a cutout region, a region positioned in a relative direction based on a position at which the object is detected in the first image, the relative direction varying depending on a detection condition.

In addition, according to the present disclosure, there is provided an image processing system including: an object detection unit configured to detect an object in a first image; a cutout region deciding unit configured to decide, as a cutout region, a region positioned in a relative direction based on a position at which the object is detected in the first image, the relative direction varying depending on a detection condition; a cutout image generation unit configured to generate a cutout image by cutting out the cutout region decided by the cutout region deciding unit from the first image; and a storage unit configured to store the generated cutout image.

Advantageous Effects of Invention

As described above, according to the present disclosure, it is possible to freely decide a position of a cutout region when cutting out an image from an original image. Note that the effects described here are not necessarily limited, and any effect that is desired to be described in the present disclosure may be exhibited.

MODE(S) FOR CARRYING OUT THE INVENTION

Figure 1:
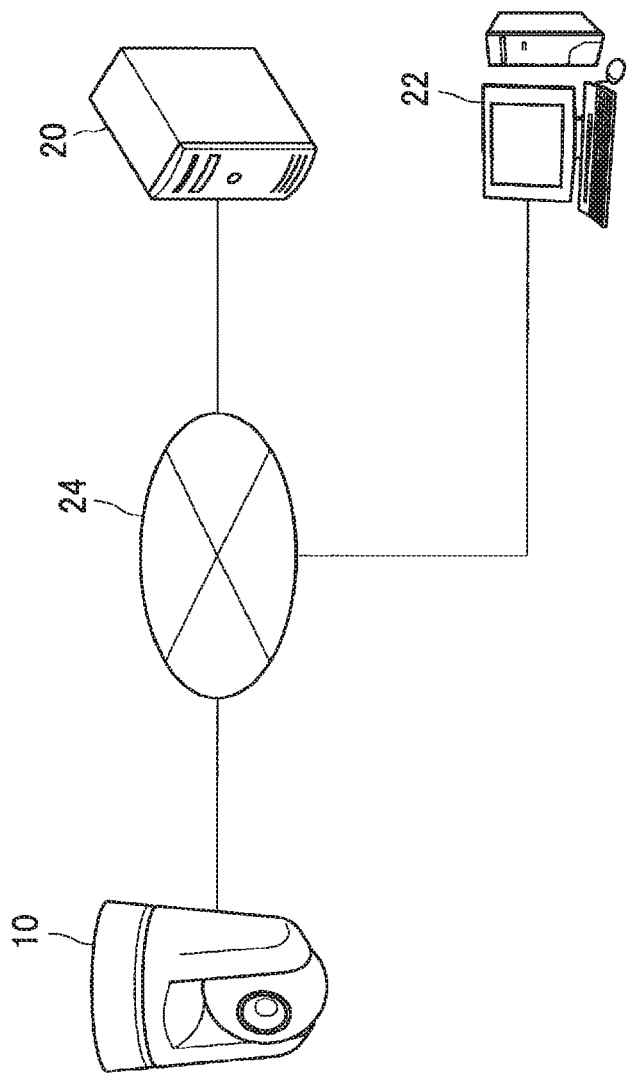
FIG. 1 is an explanatory diagram illustrating a configuration example of an image processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this specification and the drawings, structural elements that have substantially the same function and structure are sometimes distinguished from each other using different alphabets after the same reference numeral. For example, structural elements that have substantially the same function and structure are distinguished into a video cropping unit 106a and a video cropping unit 106b as necessary. However, when there is no need in particular to distinguish structural elements that have substantially the same function and structure, the same reference numeral alone is attached. For example, in the case where it is not necessary to distinguish the video cropping unit 106a and the video cropping unit 106b from each other, they are simply referred to as the video cropping units 106.

In addition, description proceeds in this section "Mode(s) for Carrying Out the Invention" in the following order.
1. Basic configuration of image processing system
2. Detailed description of embodiment
3. Application example
4. Modified example <21 1. Basic Configuration of Image Processing System>>
<1-1. Basic Configuration>

As specifically described in "2. Detailed description of embodiment" as an example, the present disclosure may be executed in a variety of forms. First, with reference to FIG. 1, a basic configuration of the image processing system according to the embodiment will be described.

As illustrated in FIG. 1, the image processing system according to the embodiment includes a camera 10, a storage 20, a monitoring terminal 22, and a communication network 24.

[1-1-1. Camera 10]

The camera 10 is an example of the image processing device according to the present disclosure. The camera 10 is a device for capturing images of an external environment. The camera 10 may be installed in a place crowded with people or automobiles, a monitoring target place, or the like. For example, the camera 10 may be installed in a road, a station, an airport, a commercial building, an amusement park, a park, a parking lot, a restricted area, or the like.

In addition, the camera 10 is capable of generating another image by using a captured image (hereinafter, referred to as an original image), and transmitting the generated image to another device via the communication network 24 (to be described later). Here, the original image is an example of the first image according to the present disclosure. For example, the original image is an image with the maximum resolution captured by the camera 10. For example, the original image may be a 4K image.

For example, the camera 10 generates another image with smaller data volume on the basis of the original image. This is because it is not preferable to transmit the original image itself to the another device since transmission of the original image with large data volume takes a long time.

Here, examples of the another image generated by the camera 10 include a shrunken image obtained by simply reducing the resolution of the original image, and a cropped image obtained by cropping (cutting out) a gaze target region. For example, the shrunken image may be a full HD image.

Figure 2:
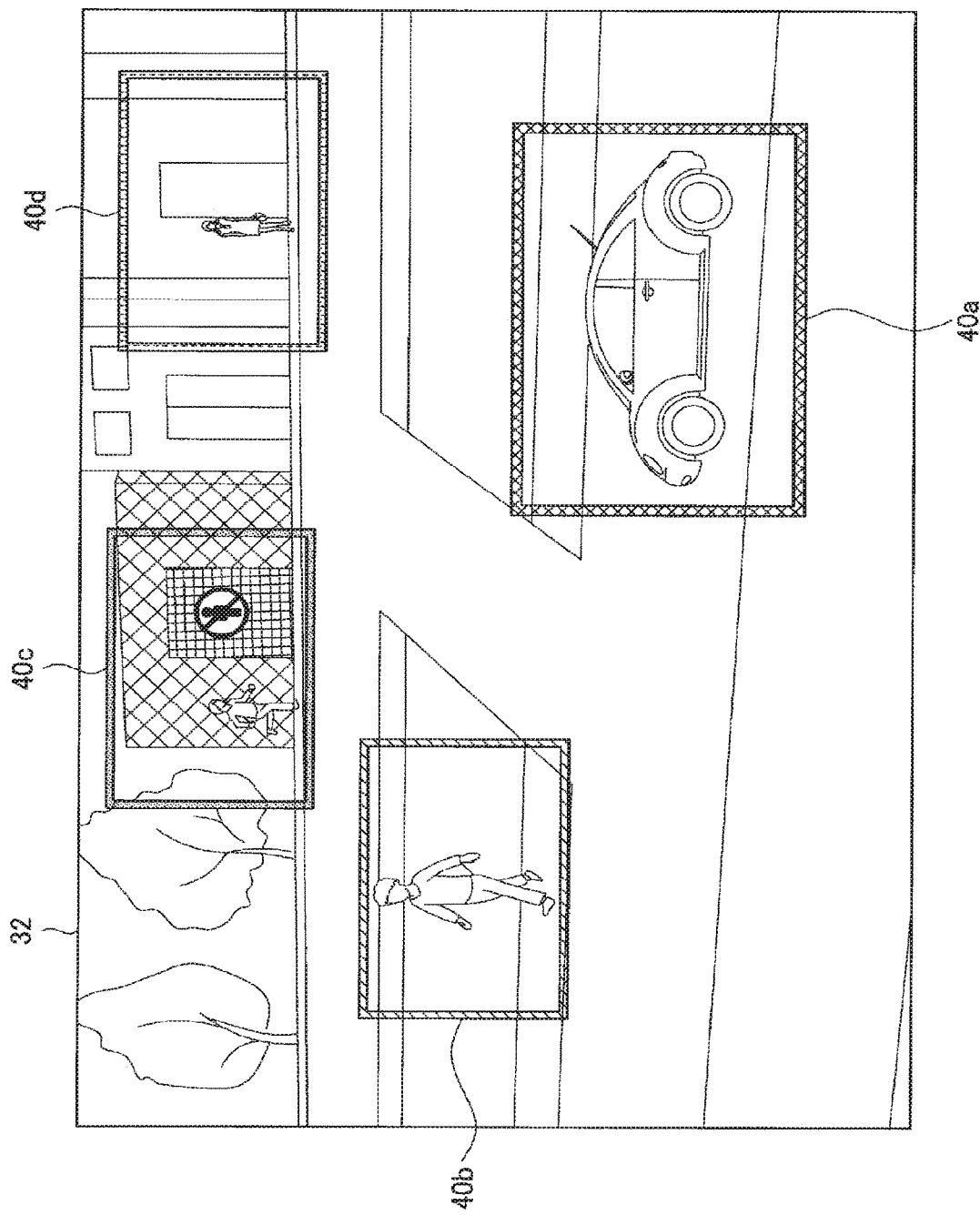
FIG. 2 is an explanatory diagram illustrating an example of a shrunken image 32 generated by a camera 10.

FIG. 2 is an explanatory diagram illustrating an example of the shrunken image (shrunken image 32). The shrunken image 32 includes all regions included in the original image. However, as illustrated in FIG. 2, the gaze target region such as a face of a person may be so small in the shrunken image 32, and therefore it may be difficult to see the gaze target region. Note that, the regions 40 illustrated in FIG. 2 are regions corresponding to cropping regions (to be described later). In general, the cropping region is set within a frame image. However, in FIG. 2, regions corresponding to the cropping regions in the shrunken image 32 are referred to as the regions 40 for convenience of description.

Figure 3:
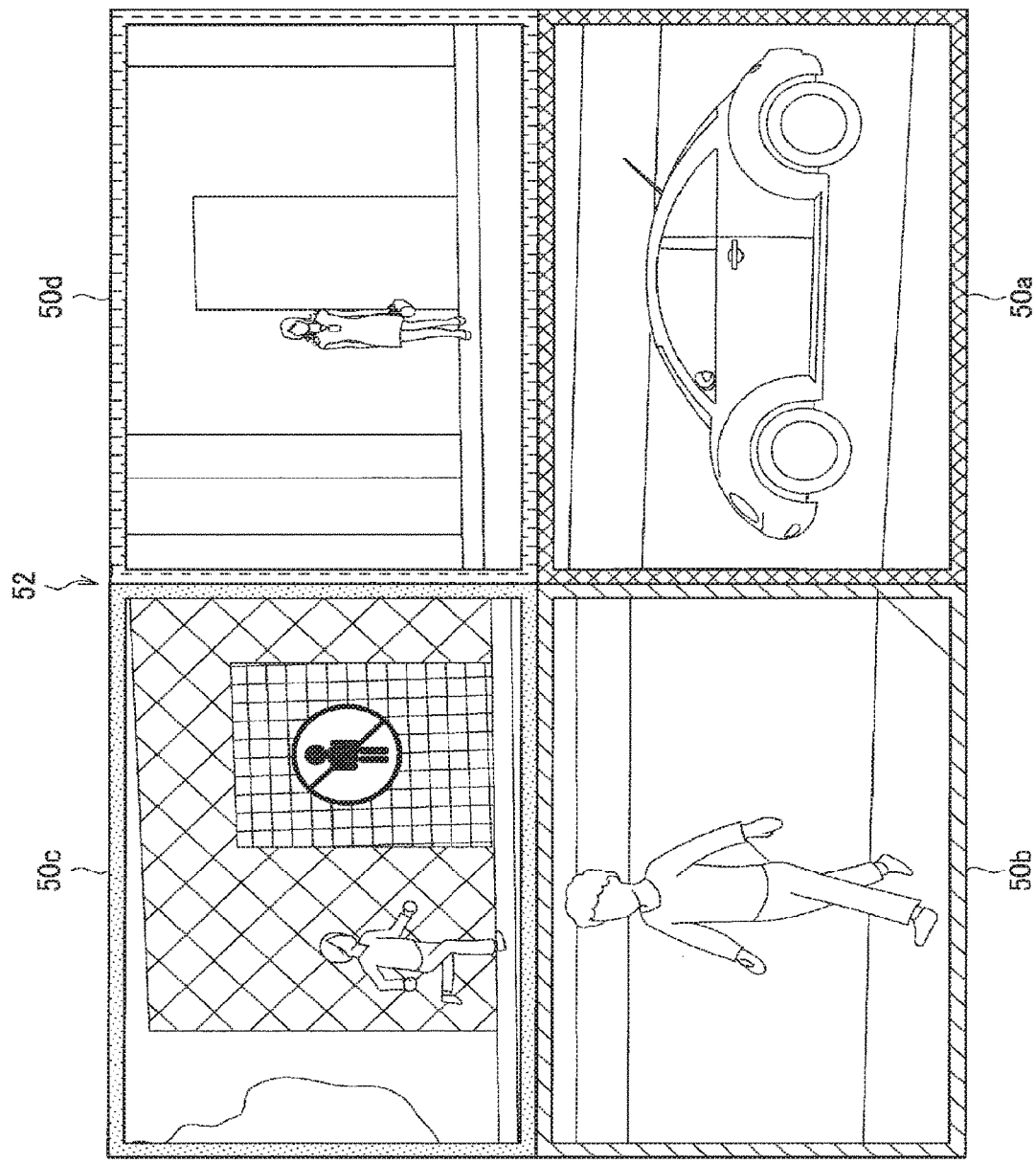
FIG. 3 is an explanatory diagram illustrating an example of a plurality of cropped images 50 generated from an original image 30.

In addition, FIG. 3 is an explanatory diagram illustrating an example of a plurality of cropped images (a set 52 of the cropped images) generated from one original image. Although the cropped images 50 have the same resolution as the original image, each of the cropped images 50 includes only a partial region of the original image, as illustrated in FIG. 3. The camera 10 according to the embodiment basically generates one shrunken image and one or more cropped images from one original image. In such a generation example, a user can check the entire scene captured by the camera 10 and can check the gaze target region at high resolution. In addition, it is possible to reduce total data volume in comparison with the original image.

Figure 4:
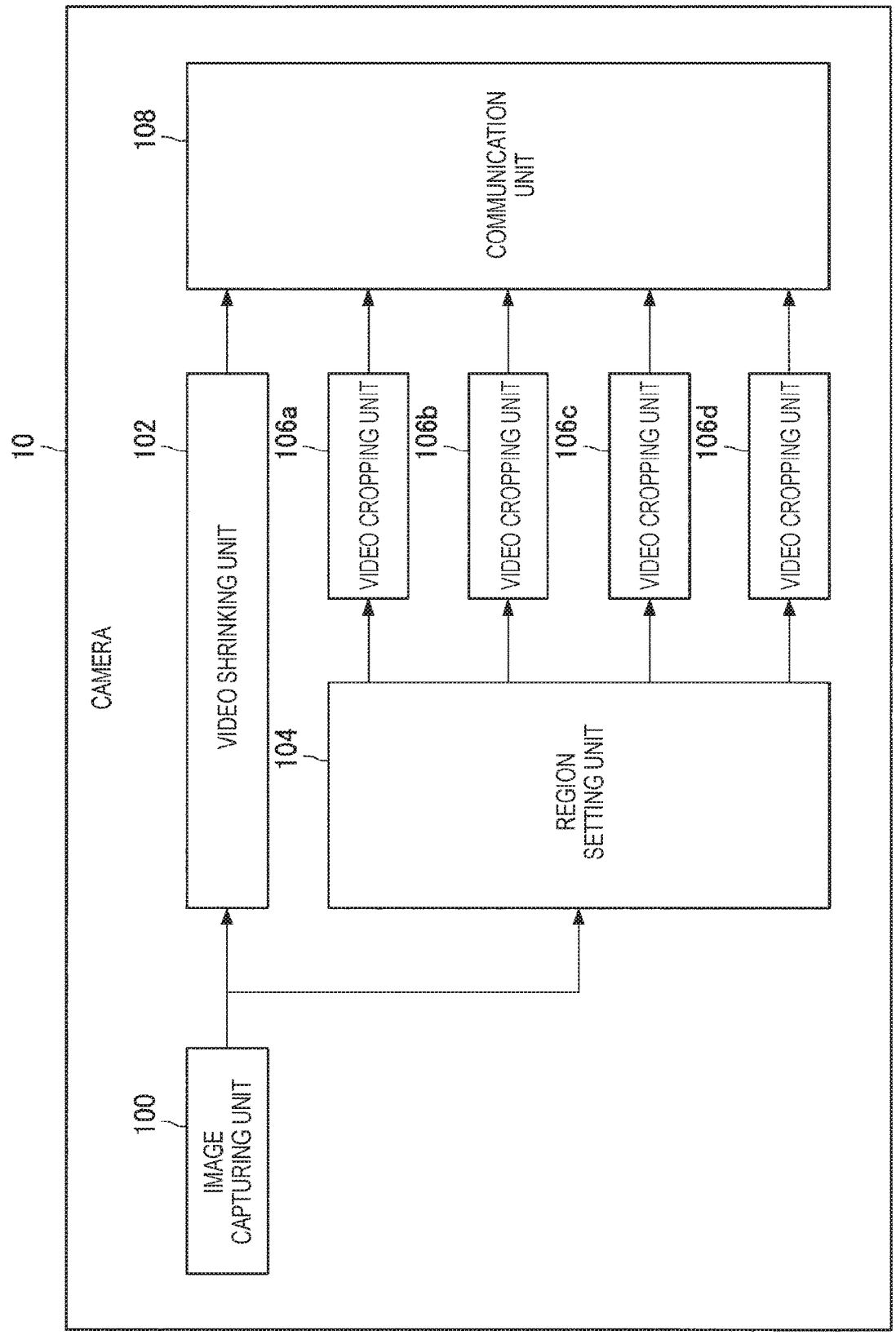
FIG. 4 is a functional block diagram illustrating a configuration of the camera 10 according to the embodiment.

Next, with reference to FIG. 4, an internal configuration of the camera 10 will be described. As illustrated in FIG. 4, the camera 10 includes an image capturing unit 100, a video shrinking unit 102, a region setting unit 104, a plurality of video cropping units 106, and a communication unit 108. Note that, although FIG. 4 shows an example in which there are four video cropping units 106, the number of the video cropping units is not limited thereto. For example, there are any number of the video cropping units as long as the minimum number is one.

(1-1-1-1. Image Capturing Unit 100)

The image capturing unit 100 has a function of acquiring the original image by causing an image sensor such as a charge-coupled device (CCD) or a complementary metal-oxide-semiconductor (CMOS) to form an image of video of an outside through a lens.

(1-1-1-2. Video Shrinking Unit 102)

The video shrinking unit 102 generates the shrunken image by shrinking the original image acquired by the image capturing unit 100 down to a predetermined size.

(1-1-1-3. Region Setting Unit 104)

The region setting unit 104 sets a cropping region in the original image acquired by the image capturing unit 100. The cropping region is a source region from which a cropped image is to be generated. For example, the region setting unit 104 sets the same number of cropping regions as the number of the video cropping units 106 in the camera 10, in the original image acquired by the image capturing unit 100.

Figure 5:
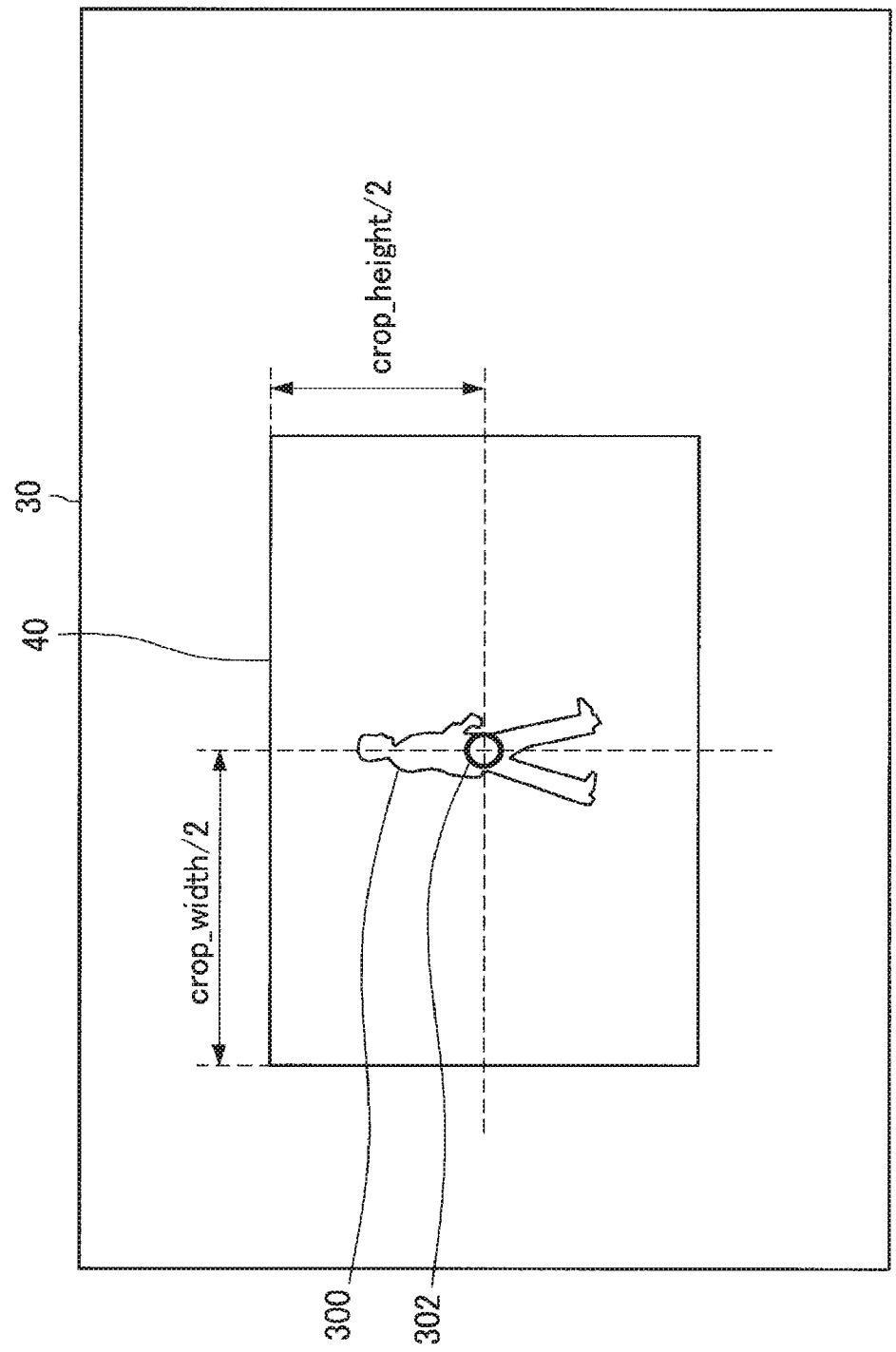
FIG. 5 is an explanatory diagram illustrating a relation between the original image 30 and a cropping region 40.

FIG. 5 is an explanatory diagram illustrating an example in which the region setting unit 104 sets a cropping region. Note that, in FIG. 5, "crop width" represents a width of the cropping region, and "crop height" represents a height of the cropping region.

As illustrated in FIG. 5, the region setting unit 104 detects a detection target object such as a person 300 in the original image 30, and sets the cropping region 40 on the basis of a detection position 302 of the object.

(1-1-1-4. Video Cropping Unit 106)

The video cropping unit 106 is an example of the cutout image generation unit according to the present disclosure. The video cropping unit 106 generates a cropped image by cutting out the cropping region set by the region setting unit 104 from the original image acquired by the image capturing unit 100.

For example, FIG. 3 illustrates four cropped images 50 respectively generated by the four video cropping units 106. As illustrated in FIG. 3, for example, the video cropping unit 106a generates a cropped image 50a from a cropping region corresponding to a region 40a illustrated in FIG. 2 that is set by the region setting unit 104. In addition, the video cropping unit 106b generates a cropped image 50b from a cropping region corresponding to a region 40b illustrated in FIG. 2 that is set by the region setting unit 104.

(1-1-1-5. Communication Unit 108)

Via the communication network 24 to be described later, the communication unit 108 exchanges various kinds of information with devices connected with the communication network 24. For example, the communication unit 108 transmits, to the storage 20, the shrunken image acquired by the video shrinking unit 102 and the plurality of cropped images generated by the plurality of video cropping units 106.

[1-1-2. Storage 20]

The storage 20 is a storage device configured to store the shrunken image and the cropped images received from the camera 10. For example, the storage 20 stores the received shrunken image and the plurality of received cropped images in association with identification information of the camera 10 and image capturing date and time. Note that, the storage 20 may be installed in a datacenter, a monitoring center where observers are working, or the like.

(1-1-3. Monitoring Terminal 22)

The monitoring terminal 22 is an information processing terminal configured to display the shrunken image and the cropped images generated by the camera 10. For example, the monitoring terminal 22 may be installed in the monitoring center.

Figure 6:
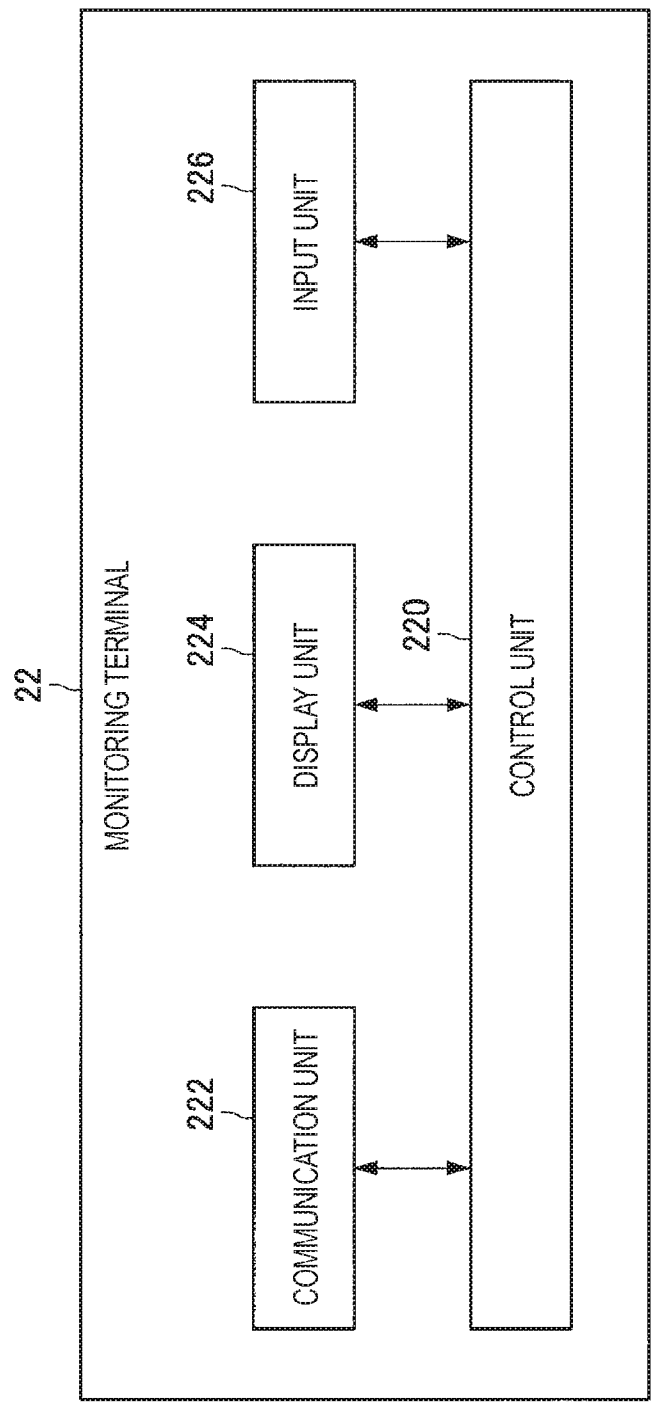
FIG. 6 is a functional block diagram illustrating a configuration of a monitoring terminal 22 according to the embodiment.

Next, details of the configuration of the monitoring terminal 22 will be described. FIG. 6 is a functional block diagram illustrating the configuration of the monitoring terminal 22 according to the embodiment. As illustrated in FIG. 6, the monitoring terminal 22 includes a control unit 220, a communication unit 222, a display unit 224, and an input unit 226.

(1-1-3-1. Control Unit 220)

The control unit 220 controls entire operation of the monitoring terminal 22 by using hardware such as a central processing unit (CPU), random access memory (RAM), and read only memory (ROM) embedded in the monitoring terminal 22.

(1-1-3-2. Communication Unit 222)

Via the communication network 24 to be described later, the communication unit 222 exchanges various kinds of information with devices connected with the communication network 24. For example, the communication unit 222 receives, from the storage 20, the shrunken image and the cropped images stored in the storage 20.

Note that, it is also possible for the communication unit 222 to directly receive the shrunken image and the plurality of cropped images generated by the camera 10 from the camera 10.

(1-1-3-3. Display Unit 224)

For example, the display unit 224 is implemented by a display such as a liquid crystal display (LCD), or an organic light emitting diode (OLED). For example, the display unit 224 displays a monitoring screen including the shrunken image and the cropped images received from the storage 20.

(1-1-3-4. Input Unit 226)

The input unit 226 includes an input device such as a mouse, a keyboard, or a microphone. The input unit 226 receives various kinds of input performed by the user on the monitoring terminal 22.

(1-1-4. Communication Network 24)

The communication network 24 is a wired or wireless communication channel through which information is transmitted from devices connected with the communication network 24. For example, the communication network 24 may include a public network, various kinds of local area networks (LANs), a wide area network (WAN), and the like. The public network includes the Internet, a satellite communication network, a telephone network, and the like, and the LANs include Ethernet (registered trademark). In addition, the communication network 24 may include a dedicated line network such as an Internet Protocol Virtual Private Network (IP-VPN).

Note that, the image processing system according to the embodiment is not limited to the above described configurations. For example, the storage 20 may be integrated with the monitoring terminal 22. Alternatively, the image processing system does not have to include the storage 20 or the monitoring terminal 22.

<1-2. Organizing of Problems>

As described above, the region setting unit 104 sets a cropping region on the basis of the detection position of the object detected in the original image.

Examples of a method for setting the cropping region include a method for setting a cropping region such that a detection position of a detection target object is at the center of the cropping region. According to this setting method, it is possible to generate the cropped image such that the user can easily see the detection target object in the cropped image.

Figure 7:
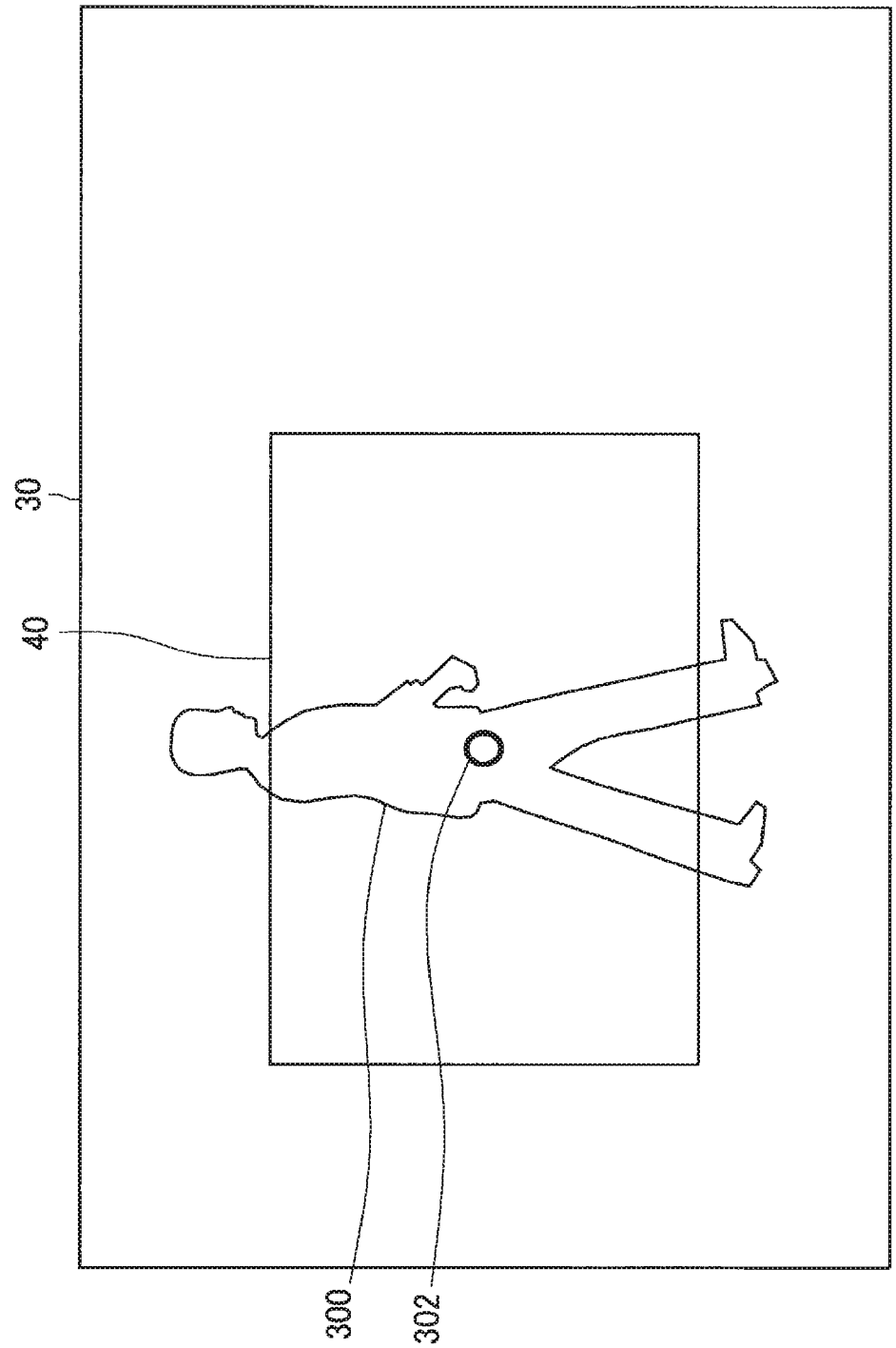
FIG. 7 is an explanatory diagram used for describing a problem to be solved in the embodiment.

On the other hand, in the case where a region size of an object is larger than the size of a cropping region, sometimes the cropping region does not include a part of the object that the user wants to detect by using such a setting method. Next, with reference to FIG. 7, details of this matter will be described. FIG. 7 is an explanatory diagram illustrating an example of setting the cropping region 40 such that the detection position 302 of the person 300 is at the center of the cropping region 40.

In general, in many cases, a human face is set as a detection target part when detecting a human. However, in the example illustrated in FIG. 7, the facial region of the person 300 is out of the cropping region 40 since the size of the person 300 is extremely larger than the size of the cropping region 40.

Therefore, the camera 10 according to the embodiment has been developed in view of the above described circumstance. The camera 10 according to the embodiment is capable of setting a cropping region such that a detection target part is included in the cropping region in accordance with the type of a detection target object.

<<2. Detailed Description of Embodiment>>

<2-1. Configuration>

The region setting unit 104 is one of the features of the camera 10 according to the embodiment. Next, with reference to FIG. 8, details of the configuration of the region setting unit 104 according to the embodiment will be described.

Figure 8:
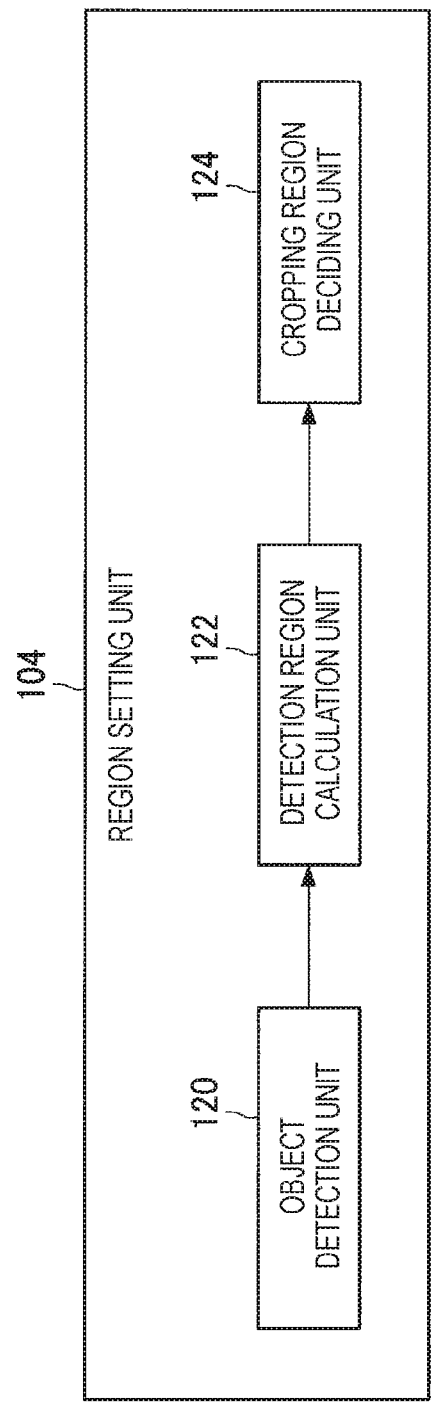
FIG. 8 is a functional block diagram illustrating a configuration of a region setting unit 104 according to the embodiment.

As illustrated in FIG. 8, the region setting unit 104 includes an object detection unit 120, a detection region calculation unit 122, and a cropping region deciding unit 124.

[2-1-1. Object Detection Unit 120]

The object detection unit 120 detects an object in the original image on the basis of a set detection condition. For example, in the case where a detection mode is set in advance (as the detection condition) in accordance with the type of a detection target object, the object detection unit 120 detects the same number of objects as the number of the video cropping units 106 in the camera 10 or the like, from the original image. The types of the objects correspond to the set detection mode. In this case, the types of the detection target objects may include a human and an automobile. In addition, the types of the detection target objects may further include a ship, an airplane, a motorcycle, and a bicycle.

For example, in the case where the set detection mode is a "human detection mode", the object detection unit 120 detects regions in which people are captured in the original image.

Note that, the detection mode may be set as a mode for detecting only one type of object, or may be set as a mode for detecting a plurality of types of objects such as "human and automobile detection mode". In addition, the detection mode may be set or changed by an administrator at any timing, for example. Alternatively, a specific detection mode (such as "human detection mode") is set in the camera 10 at the time of development of the camera 10.

In addition, the types of the objects may be classified into a plurality of stages such as a broad category and a narrow category, and different detection modes may be set for classes in different stages. For example, in the case where the broad category is "automobile", the narrow categories include "truck", "standard-sized car", and the like. In addition, a "truck detection mode", a "standard-sized-car detection mode", or the like may be set as the detection mode.

[2-1-2. Detection Region Calculation Unit 122]

The detection region calculation unit 122 calculates a region size of the object detected by the object detection unit 120. For example, the detection region calculation unit 122 calculates, as the region size of the object, the region size of the object detected in the original image acquired by the image capturing unit 100.

Alternatively, the detection region calculation unit 122 calculates, as the region size of the object, an average value of region sizes of the object detected in a predetermined number of original images (hereinafter, sometimes referred to as frame images) such as several original images or a few dozen original images that have been captured at the last minute. According to such a calculation example, it is possible to suppress large change in content of cropped images generated from a series of frame images even in the case where the size of the object detected in the series of frame images varies significantly.

(2-1-2-1. Modified Example)

Note that, in the modified example, it is also possible for the detection region calculation unit 122 to calculate the region size of the object by applying an infinite impulse response (IIR) filter, least-squares fitting, or a Kalman filter on a predetermined number of past frame images instead of calculating the average value.

In general, in the case where the region size of the object is increasing, the average value of the region sizes of the object in the past frame images is smaller than the region size of the object in a current frame image. In the modified example, it is possible to control the region size of the object to be calculated such that the region size is kept from becoming too small (in comparison with the region size of the object in the current frame image) even in the case where the region size of the object is increasing.

(2-1-2-2. Modified Example 2)

Alternatively, according to another modified example, it is possible for the detection region calculation unit 122 to calculate a final region size of the object by adding a predetermined margin to the region size calculated on the basis of the above described calculation method. For example, the detection region calculation unit 122 may calculate a final region size of the object by enlarging the region size calculated on the basis of the above described calculation method to a predetermined percentage such as 110%. Alternatively, the detection region calculation unit 122 may calculate a final region size of the object by adding predetermined lengths to the width and the height of the calculated region size of the object.

[2-1-3. Cropping Region Deciding Unit 124]

The cropping region deciding unit 124 is an example of the cutout region deciding unit according to the present disclosure. On the basis of the size of the object calculated by the detection region calculation unit 122, the cropping region deciding unit 124 decides, as the cropping region, a region positioned in a relative direction based on the detection position of the object in the original image, the relative direction corresponding to the type of the object. For example, in the case where the size of the object calculated by the detection region calculation unit 122 is larger than the size of the cropping region, the cropping region deciding unit 124 calculates a position (correction position) moved from the detection position of the object in the original image by a predetermined distance in the direction corresponding to the type of the object, and decides the cropping region such that the calculated correction position is at the center of the cropping region. Note that, for example, the camera 10 may store a database in which correspondence relations between types of objects, movement directions (correction directions) of cropping regions, and movement distance calculation formulas are stored. In addition, the cropping region deciding unit 124 is capable of calculating the correction position by using this database.

Alternatively, in the case where the size of the object calculated by the detection region calculation unit 122 is smaller than the size of the cropping region, the cropping region deciding unit 124 decides the cropping region such that the detection position of the object in the original image is at the center of the cropping region.

Figure 9:
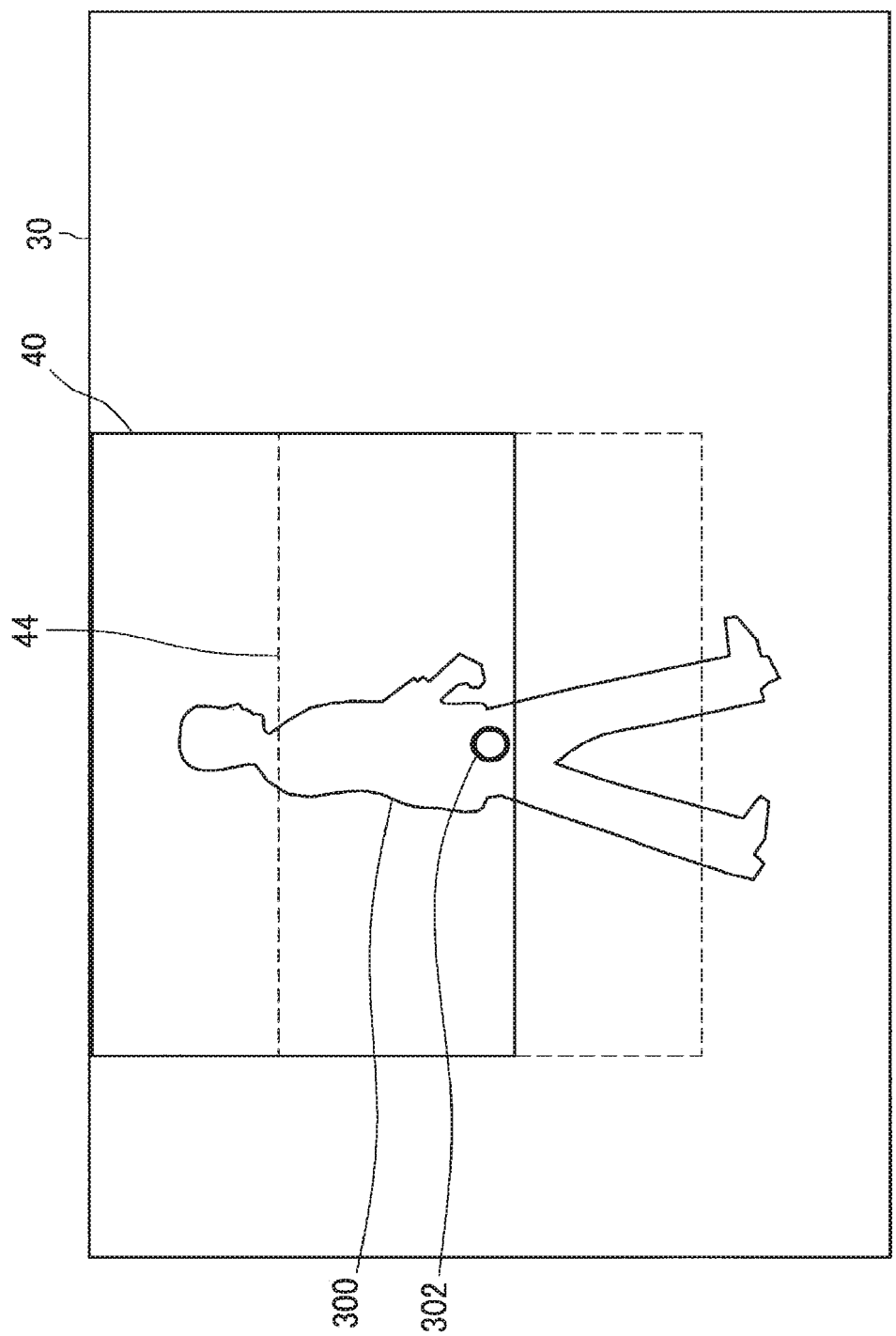
FIG. 9 is an explanatory diagram illustrating an example of deciding the cropping region 40 according to the embodiment.

Next, with reference to FIG. 9 to FIG. 11, details of the above described functions will be described. FIG. 9 is an explanatory diagram illustrating an example of deciding a cropping region in the case where a type of a detection target object is a human. Note that, in FIG. 9, a dashed rectangle represents a cropping region 44 decided such that a detection position 302 of a person is at the center of the cropping region 44 (hereinafter, referred to as a standard cropping region 44). In addition, a solid rectangle represents a cropping region 40 finally decided by the cropping region deciding unit 124.

(2-1-3-1. Decision Example 1)

For example, as illustrated in FIG. 9, in the case where the type of the detection target object is a "human" and the region size of the detected person 300 is larger than the size of the cropping region, the cropping region deciding unit 124 decides the cropping region 40 by moving the standard cropping region 44 in the relative upper direction in the original image 30. For example, in such a case, the cropping region deciding unit 124 first calculates a difference between the height of the upper side of the standard cropping region 44 and the height of the top of the head of the detect person 300. Next, the cropping region deciding unit 124 calculates a position obtained by moving the detection position 302 of the person in the upper direction by the calculated difference or more. Subsequently, the cropping region deciding unit 124 decides the cropping region 40 such that the calculated position is at the center of the cropping region 40.

In general, in the case where the type of the detection target object is a "human", a human face is designated as the detection target part in many cases. In the decision example 1, it is possible to decide the cropping region such that a face of a detection target person is included in the cropping region.

Figure 10:
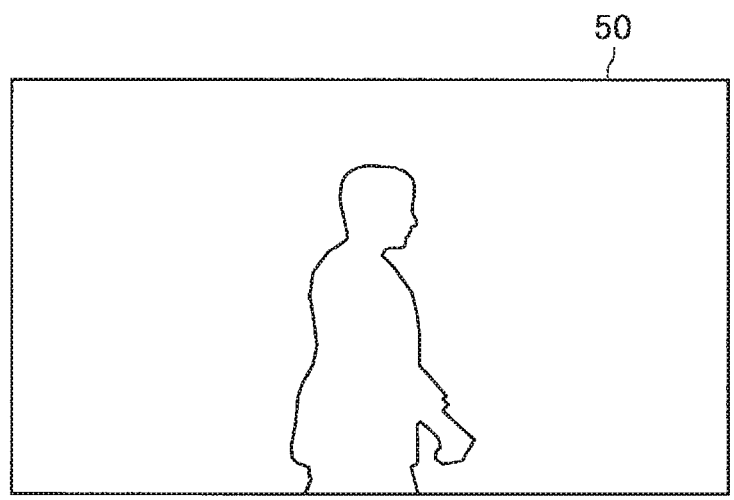
FIG. 10 is an explanatory diagram illustrating an example of generating a cropped image 50 of a person according to the embodiment.

Note that, FIG. 10 is an explanatory diagram illustrating an example of a cropped image (cropped image 50) generated by the video cropping unit 106 on the basis of the cropping region 40 illustrated in FIG. 9. As illustrated in FIG. 10, the cropped image 50 is generated by the video cropping unit 106 cutting out the cropping region 40 from the original image 30.

(2-1-3-2. Decision Example 2)

Figure 11:
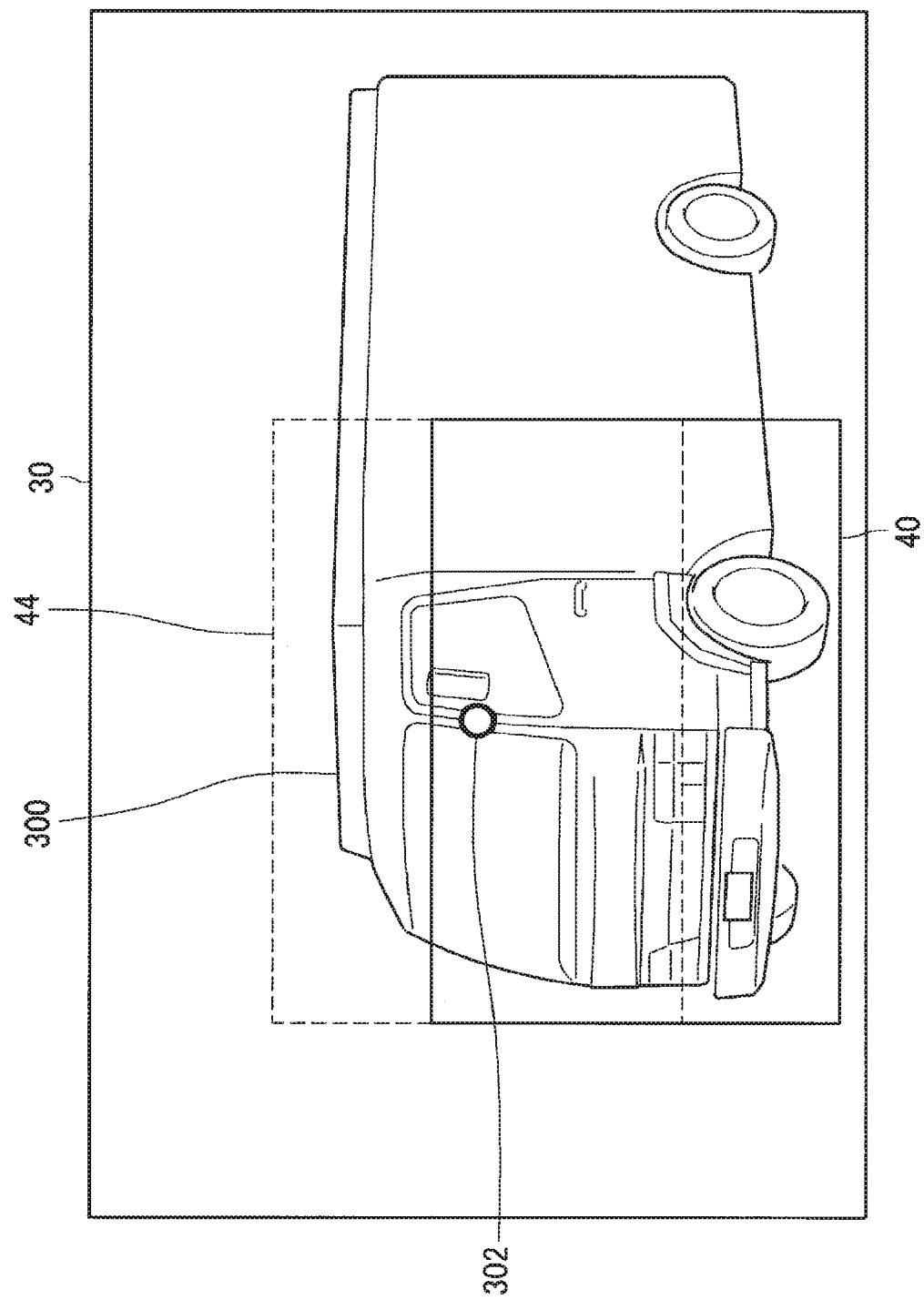
FIG. 11 is an explanatory diagram illustrating another example of deciding the cropping region 40 according to the embodiment.

Alternatively, as illustrated in FIG. 11, in the case where the type of the detection target object is a "large-size automobile" such as a truck, the cropping region deciding unit 124 decides the cropping region 40 by moving the standard cropping region 44 in the relative lower direction in the original image 30. For example, in such a case, the cropping region deciding unit 124 first calculates a difference between the height of the base of the standard cropping region 44 and the height of the bottom of a tire of the detected truck 300. Next, the cropping region deciding unit 124 calculates a position obtained by moving the detection position 302 of the truck in the lower direction by the calculated difference. Subsequently, the cropping region deciding unit 124 decides the cropping region 40 such that the calculated position is at the center of the cropping region 40.

In general, in the case where the type of the detection target object is an "automobile", a vehicle registration plate is designated as the detection target part in many cases. In the decision example 2, it is possible to decide the cropping region such that a vehicle registration plate of a detection target truck is included in the cropping region.

(2-1-3-3. Modified Example)

Note that, in the above description, the example in which the cropping region deciding unit 124 decides the cropping region by moving the position of the standard cropping region in the direction corresponding to the type of the detection target object has been described. However, the present disclosure is not limited thereto.

In the modified example, it is also possible for the cropping region deciding unit 124 to decide the cropping region by enlarging the size of the standard cropping region in a direction corresponding to the type of a detection target object on the basis of a detection position of the detection target object. For example, in the example illustrated in FIG. 9, the cropping region deciding unit 124 may enlarge the standard cropping region 44 in the upper direction by the difference between the height of the upper side of the standard cropping region 44 and the height of the top of the head of the detected person 300 or more, and decide the obtained (rectangular) region as the cropping region.

<2-2. Operation>

The configurations according to the embodiment have been described above. Next, with reference to FIG. 12 to FIG. 14, operation according to the embodiment will be described. Note that, an operation example will be described in which the camera 10 includes four video cropping units 106 and one shrunken image and four cropped images are generated from one original image.

[2-2-1. Overall Operation]

Figure 12:
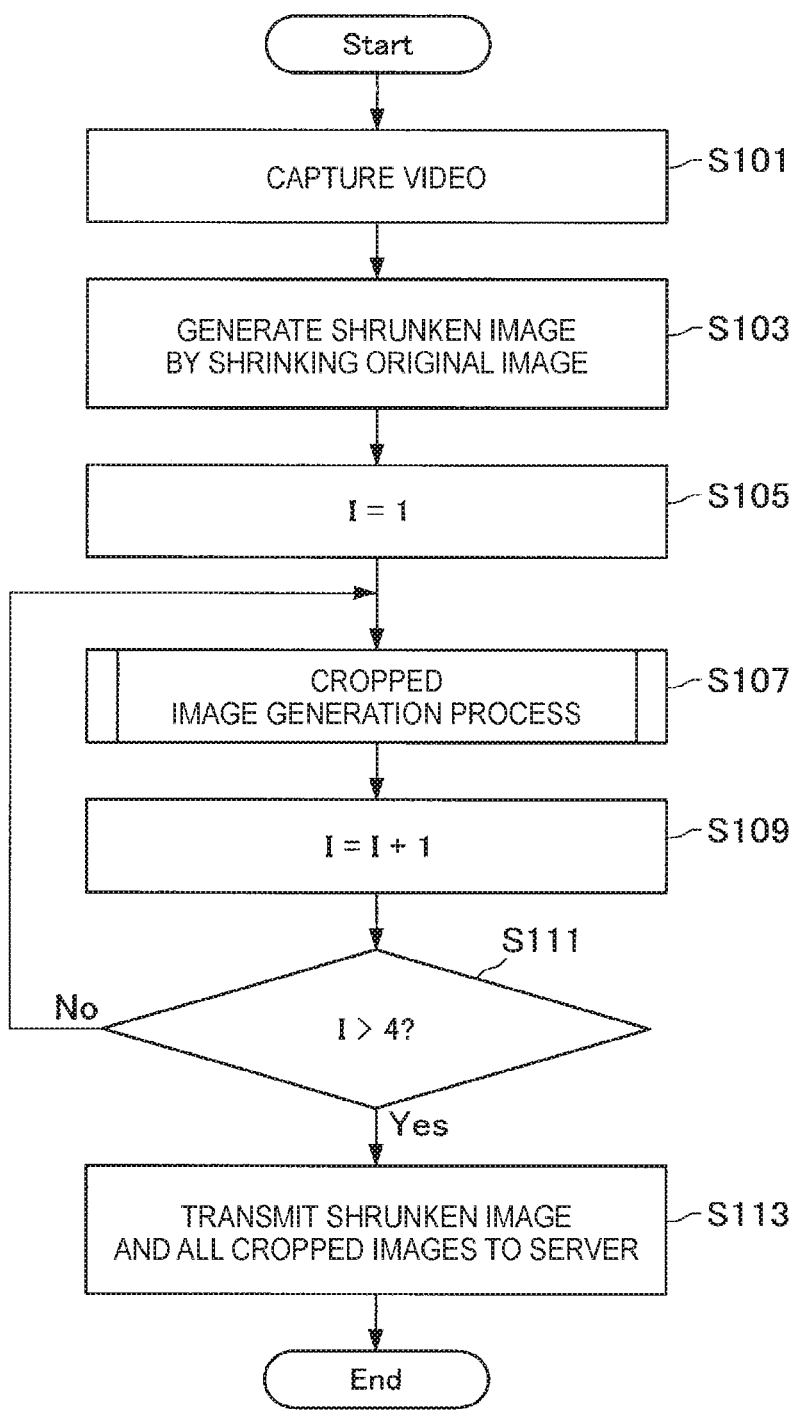
FIG. 12 is a flowchart illustrating operation according to the embodiment.

FIG. 12 is a flowchart illustrating an operation example according to the embodiment. As illustrated in FIG. 12, first, the image capturing unit 100 of the camera 10 acquires an original image by capturing video of an outside when a predetermined timing comes (S101).

Next, the video shrinking unit 102 generates a shrunken image by shrinking the original image acquired in S101 down to a predetermined size (S103).

Subsequently, the camera 10 performs a "cropped image generation process" (to be described later) the same number of times as the number of the video cropping units 106 (in other words, four times) (S105 to S111).

Next, the communication unit 108 transmits the shrunken image generated in S103 and four cropped images generated in S107 to the storage 20 (S113).

[2-2-2. Cropped Image Generation Process]

Figure 13:
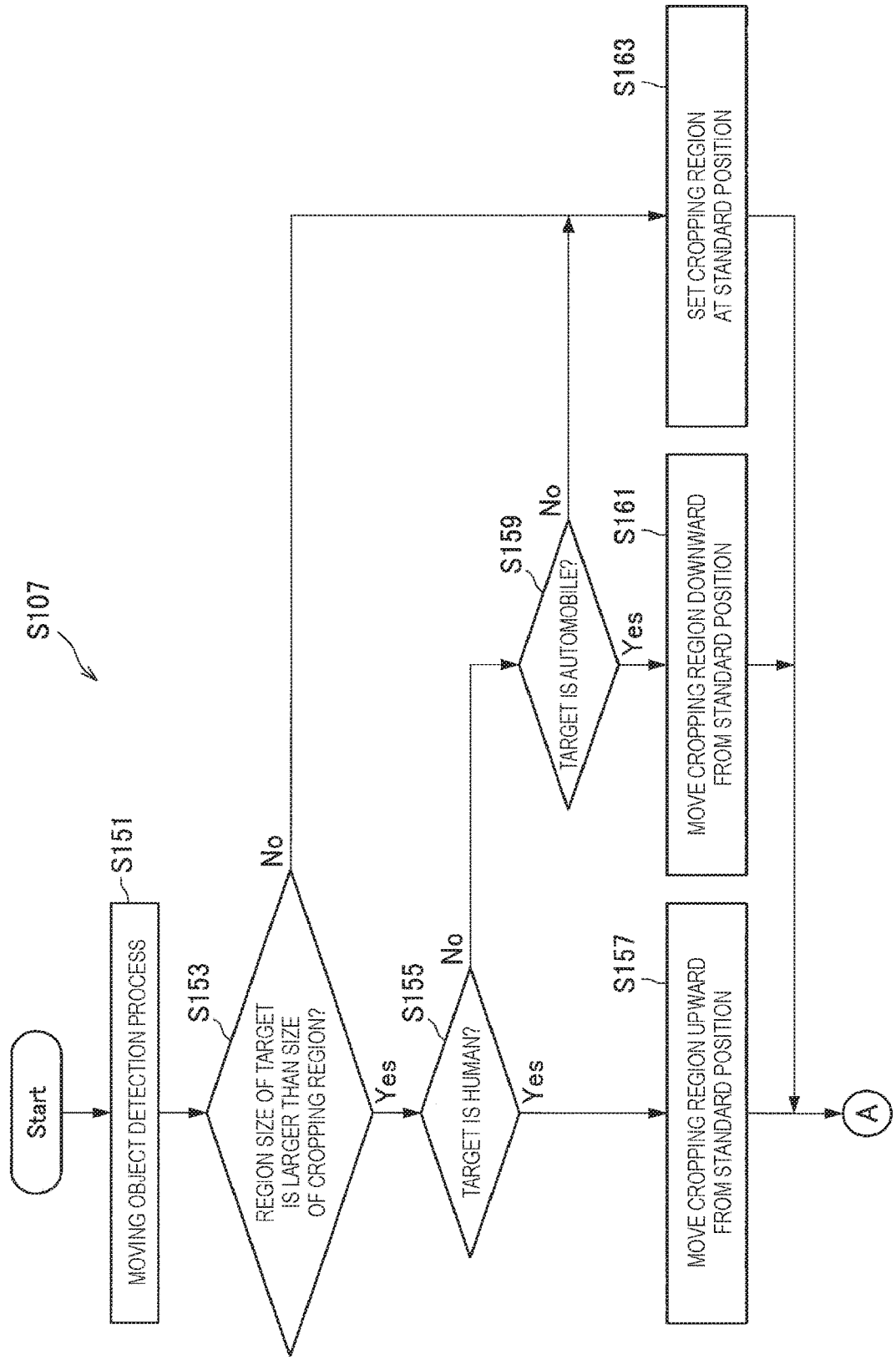
FIG. 13 is a flowchart illustrating a part of operation of a cropped image generation process according to the embodiment.
Figure 14:
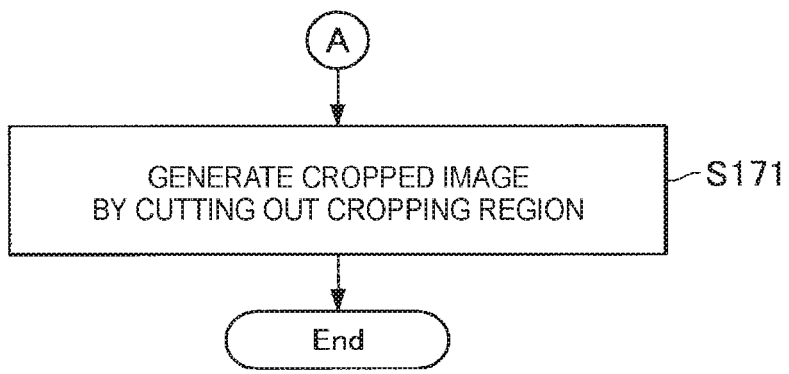
FIG. 14 is a flowchart illustrating a part of the operation of the cropped image generation process according to the embodiment.

Next, with reference to FIG. 13 to FIG. 14, details of operation in the "cropped image generation process" in S107 will be described. As illustrated in FIG. 13, first the object detection unit 120 of the camera 10 detects a detection target object in the original image acquired in S101, on the basis of a preset detection mode (S151).

Next, the detection region calculation unit 122 calculates a region size of the object detected in S151. Subsequently, the cropping region deciding unit 124 determines whether the calculated region size is larger than the size of the cropping region (S153).

In the case where the calculated region size is less than or equal to the size of the cropping region (No in S153), the cropping region deciding unit 124 decides that the standard cropping region is used as the cropping region. In other words, the cropping region deciding unit 124 decides the cropping region such that the detection position of the object detected in S151 is at the center of the cropping region (S163). Next, the camera 10 performs operation in S171 to be described later.

On the other hand, in the case where the calculated region size is larger than the size of the cropping region (Yes in S153), the cropping region deciding unit 124 determines whether the type of the object corresponding to the set detection mode is a human (S155). In the case where the type of the detection target object is a "human" (Yes in S155), the cropping region deciding unit 124 decides the cropping region by moving the standard cropping region in the upper direction in the original image acquired in S101 (S157) Next, the camera 10 performs operation in S171 to be described later.

On the other hand, in the case where the type of the object corresponding to the set detection mode is an "automobile" (No in S155 and Yes in S159), the cropping region deciding unit 124 decides the cropping region by moving the standard cropping region in the lower direction in the original image acquired in S101 (S161). Next, the camera 10 performs operation in S171 to be described later.

Alternatively, in the case where the type of the object corresponding to the set detection mode is not a human or an automobile (No in S155 and No in S159), the cropping region deciding unit 124 performs operation in S163 described above.

Next, with reference to FIG. 14, operation after S163 will be described. As illustrated in FIG. 14, the video cropping unit 106 generates a cropped image by cutting out the cropping region decided in S157, S161, or S163 from the original image acquired in S101 (S171).

<2-3. Effects>
[2-3-1. Effect 1]

As described with reference to FIG. 4, FIG. 8, FIG. 12 to FIG. 14, and the like, the camera 10 according to the embodiment detects an object from a captured original image, and decides, as a cropping region, a region positioned in a relative direction based on a detection position of the object in the original image, the relative direction varying depending on a detection condition. Therefore, it is possible to change the position of the cutout region depending of the detection condition even if detection positions of objects are the same.

For example, in the case where the size of the detected object is larger than the size of the cropping region, the camera 10 decides the cropping region such that the correction position obtained by moving the detection position of the object in the original image by a moving distance corresponding to the type of the object in the direction corresponding to the type of the object is at the center of the cropping region. Therefore, it is possible to set the cropping region such that a detection target part of the detection target object is included in the cropping region even in the case where the region size of the detection target object is larger than the size of the cropping region. As a result, visibility of the detection target part (such as human face) in the cropped image can be improved.

[2-3-2. Effect 2]

In addition, since the method for deciding a cropping region by the cropping region deciding unit 124 is simple, the camera 10 can generate cropped images in real time.

[2-3-3. Effect 3]

In addition, according to the embodiment, it is possible to generate a shrunken image and cropped images simply by the camera 10. Accordingly, the camera 10 does not have to transmit the original image to another device such as a server to generate the shrunken image and the cropped images, and this enables reducing communication traffic.

<<3. Application Example>>

The embodiment has been described above. Next, an application example of the embodiment will be described. Note that, the configuration of the image processing system according to the application example is the same as the embodiment illustrated in FIG. 1. First, a background where the application example has been developed will be described.

Another problem of the method for setting a cropping region such that a detection position of a detection target object is at the center of the cropping region is that, sometimes a part of the cropping region is out of the original image when the target object is positioned near an edge of the original image.

Figure 15:
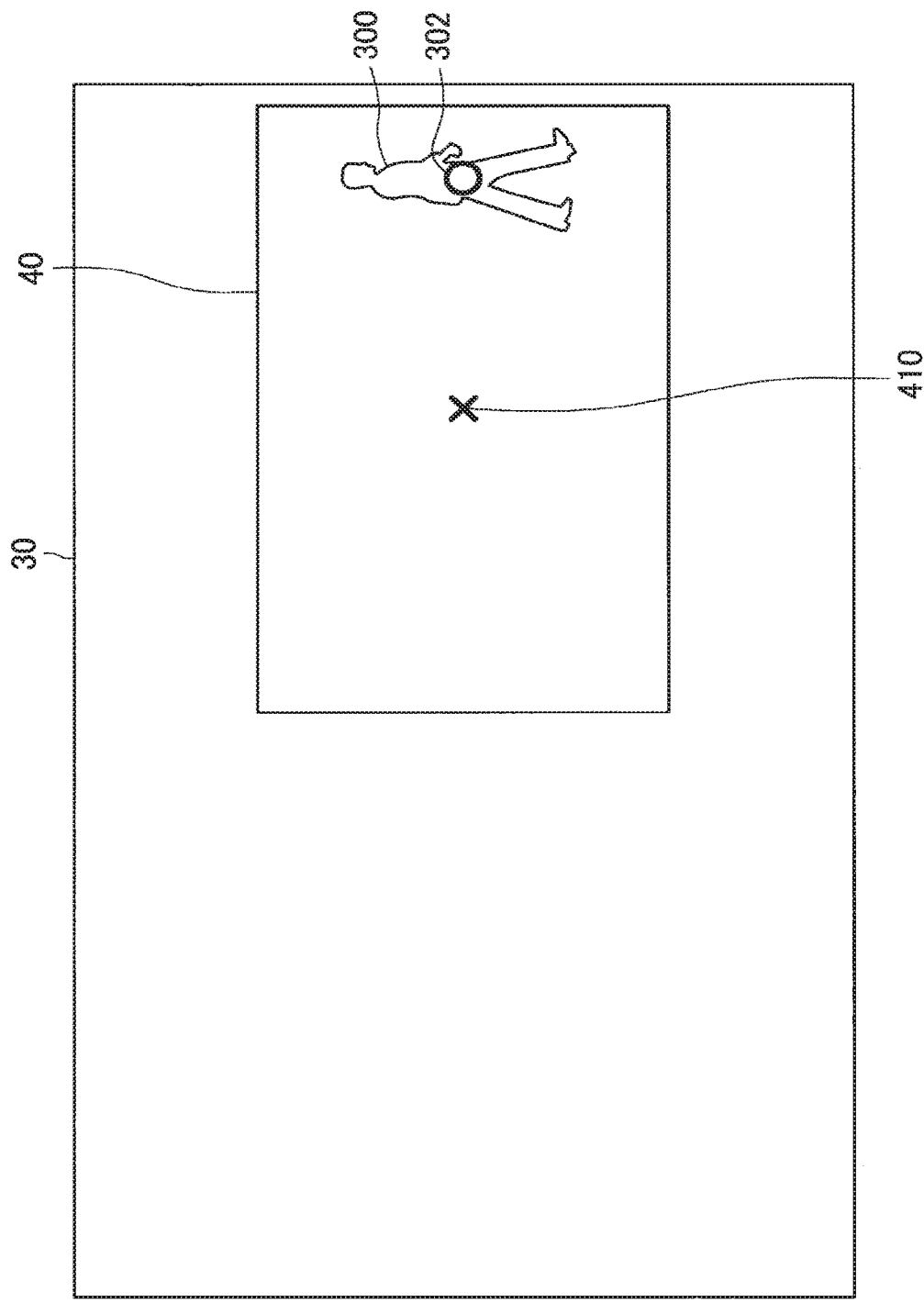
FIG. 15 is an explanatory diagram used for describing a problem to be solved in an application example of the embodiment.

A known technology for solving this problem proposes a method for setting a position of a cropping target object at a position different from the center of the cropping region. For example, as illustrated in FIG. 15, the known technology decides the cropping region 40 such that a part of an edge of the cropping region 40 is identical to a part of an edge of the original image 30.

Figure 16:
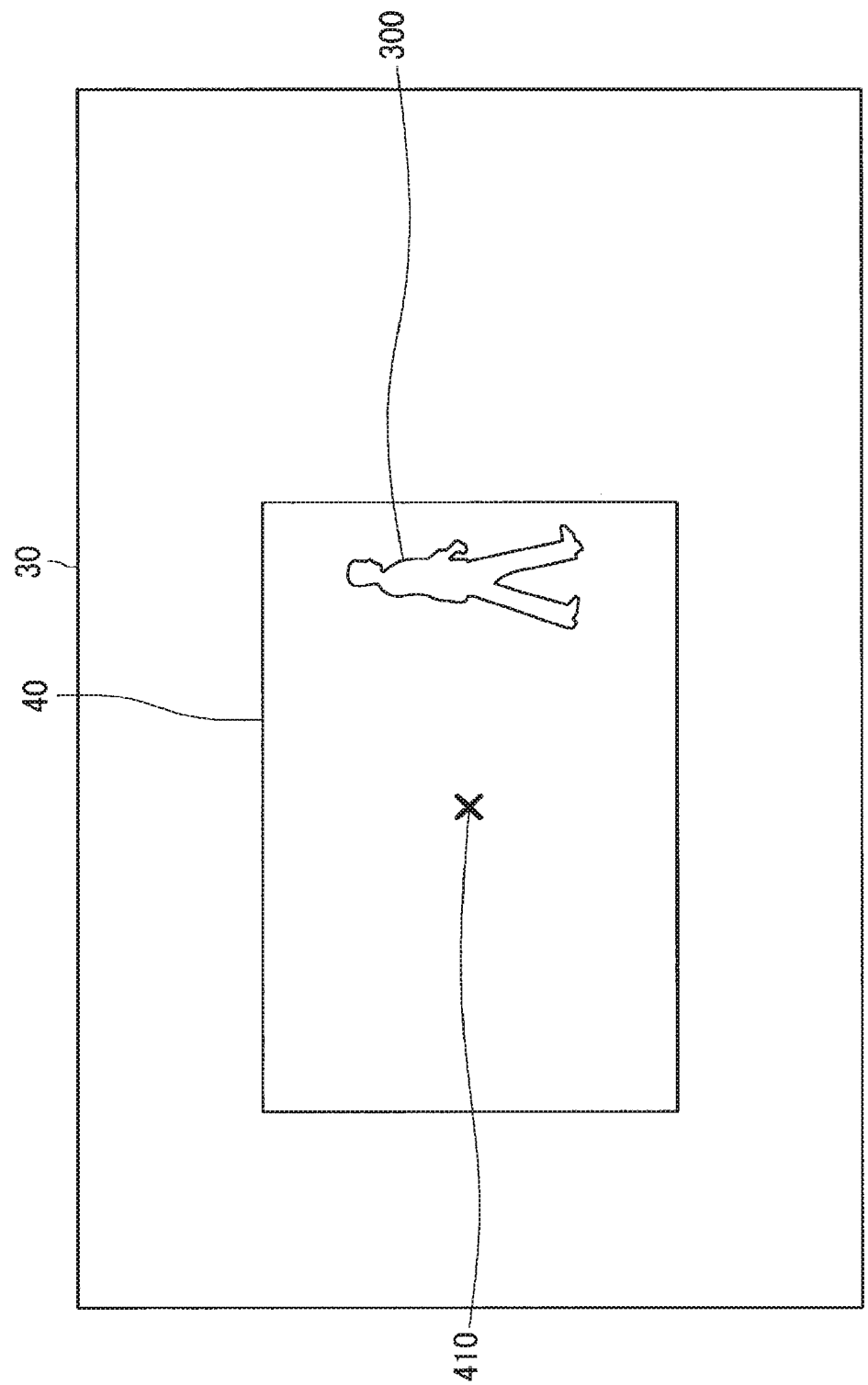
FIG. 16 is another explanatory diagram used for describing a problem to be solved in the application example.

However, in the object detection process, the detection target object is not always surely detected, and sometimes the detection fails. In addition, in the case where the detection fails, the position of the object (person) in the original image 30 is generally different from the central position 410 of the cropping region 40 as illustrated in FIG. 16, for example.

As described above, the known technology includes a problem that a user cannot determine whether detection of a detection target object has failed or the detection target object is near an edge of the original image simply by seeing the cropped image.

As described later, according to the application example, it is possible to clearly show a region out of the original image in a cropped image to a user in the case where a part of the cropped image is out of the original image.

<3-1. Configuration>

Next, a configuration of the camera 10 according to the application example will be described. Note that, the structural elements included in the camera 10 according to the application example are similar to the embodiment described with reference to in FIG. 4 and FIG. 6. Hereinafter, only a structural element having a different function from the above-described embodiment will be described.

[3-1-1. Video Cropping Unit 106]

In the case where a part of the cropping region decided by the cropping region deciding unit 124 is out of the original image, the video cropping unit 106 according to the application example generates a cropped image such that the cropped image includes display showing the region out of the original image. In such a case, the video cropping unit 106 fills the region out of the original image with a predetermined color or a predetermined pattern in the cropped image, for example. In addition, in such a case, the video cropping unit 106 places a predetermined character string in the region out of the original image. In such a generation example, it is possible to clearly show the region out of the original image in the cropped image to a user.

Figure 17:
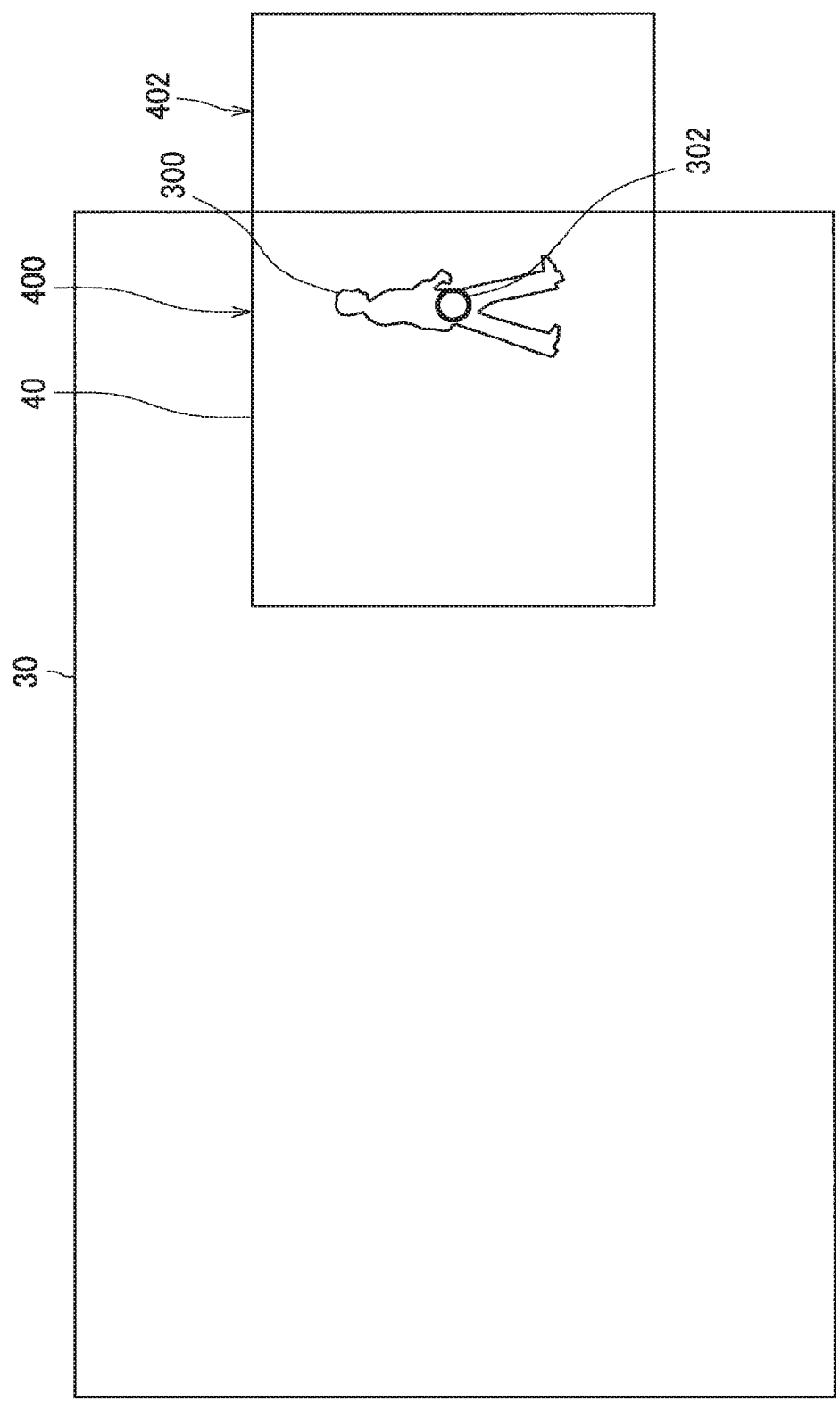
FIG. 17 is an explanatory diagram illustrating an example of deciding a cropping region according to the application example.

Next, with reference to FIG. 17 to FIG. 18, details of the above description will be described. FIG. 17 is an explanatory diagram illustrating an example of the cropping region 40 decided by the cropping region deciding unit 124 in the case where the person 300 is near an edge of the original image 30. In the example illustrated in FIG. 17, the region size of the person 300 is smaller than the size of the cropping region 40. Therefore, the cropping region deciding unit 124 decides the cropping region 40 such that the detection position 302 of the person is at the center of the cropping region 40. As a result, as illustrated in FIG. 17, a partial region 402 in the cropping region 40 becomes out of the original image 30.

Figure 18:
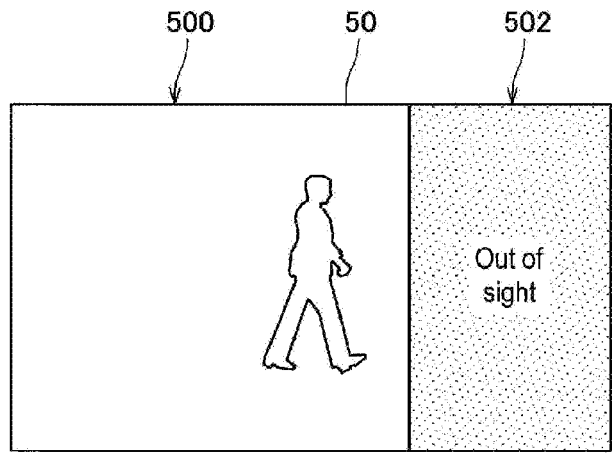
FIG. 18 is an explanatory diagram illustrating an example of generating a cropped image according to the application example.

In addition, FIG. 18 is an explanatory diagram illustrating an example of a cropped image (cropped image 50) generated by the video cropping unit 106 in the case where the cropping region 40 is decided as illustrated in FIG. 17. As illustrated in FIG. 18, the video cropping unit 106 generates the cropped image 50 such that the cropped image 50 includes a region 500 cut out from the original image 30, and an extruded region 502 that is a region out of the original image 30. Here, the cutout region 500 is identical to the region 400 included in the original image 30 in the cropping region 40 illustrated in FIG. 17.

In addition, as illustrated in FIG. 18, the video cropping unit 106 fills the extruded region 502 with a predetermined color, and places a character string such as "Out of sight" in the extruded region 502. The character string clearly shows that this region is an extruded region.

This cropped image 50 can clearly show that the detection of the detection target object has succeeded and the object is near the edge in the original image. In addition, it is also possible to clearly show which of the edges the object is close to in the original image (for example, in the example illustrated in FIG. 18, the object is close to the right edge of the original image).

Note that, the other structural elements in the camera 10 have functions similar to the embodiment described above.

<3-2. Operation>

Figure 19:
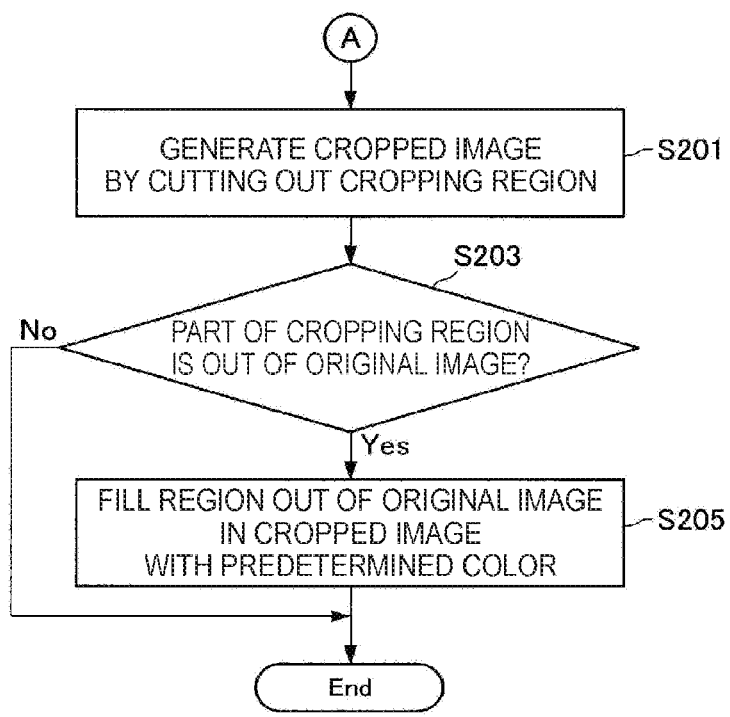
FIG. 19 is a flowchart illustrating a part of operation of a cropped image generation process according to the application example.

The configuration according to the application example has been described above. Next, with reference to FIG. 19, operation according to the application example will be described. FIG. 19 is a flowchart illustrating a part of operation of the "cropped image generation process" according to the application example. Note that, operation similar to the operation in S101 to S163 illustrated in FIG. 12 and FIG. 13 according to the embodiment is also used in the application example. In addition, the operation in S201 of FIG. 19 is similar to S171 in FIG. 14 according to the above described embodiment. Hereinafter, operation after S201 will be described.

As illustrated in FIG. 19, the video cropping unit 106 determines whether a part of the cropping region decided in S157, S161, or S163 is out of the original image acquired in S101 (S203) after S201. In the case where the part of the cropping region is not out of the original image (No in S203), the camera 10 finishes the "cropped image generation process".

On the other hand, in the case where the part of the cropping region is out of the original image (Yes in S203), the region out of the original image in the cropping region in the cropped image generated in S201 is filled with a predetermined color or a predetermined pattern (S205).

<3-3. Effects>

As described with reference to FIG. 19 and the like, the camera 10 according to the application example generates a cropped image such that the cropped image includes display showing the region out of the original image in the case where the part of the decided cropping region is out of the original image. Therefore, the user can determine whether the detection of the object has failed or the detection of the detection target object has succeeded but the object is near an edge in the original image, simply by seeing the cropped image.

In addition, in the case where the detection target object is near the edge of the original image, the user can recognize which of the edges the object is close to, simply by seeing the cropped image.

<<4. Modified Examples>>

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

<4-1. Modified Example 1>

In the above described embodiment, the example in which the camera 10 serves as the image processing device according to the present disclosure has been described. However, the present disclosure is not limited thereto. For example, the monitoring terminal 22 may serve as the image processing device according to the present disclosure in the case where (the control unit 220 of) the monitoring terminal 22 includes all the video shrinking unit 102, the region setting unit 104, and the plurality of video cropping units 106 instead of the camera 10.

Alternatively, a separately-provided server (not illustrated) may serve as the image processing device according to the present disclosure in the case where the server is capable of communicating with the camera 10 via the communication network 24 and the server includes all the video shrinking unit 102, the region setting unit 104, and the plurality of video cropping units 106 instead of the camera 10. In addition, the server may be integrated with the storage 20.

<4-2. Modified Example 2>

In addition, the example in which there is a preset detection mode has mainly been described in the above described embodiment. However, the present disclosure is not limited thereto. For example, the camera 10 is capable of identifying the type of the object included in the captured original image, and dynamically setting a detection mode corresponding to the identified type. For example, in the case where the type of the object included in the captured original image is a human only, it is possible for the camera 10 to identify that the object is a human by calculating a width-height ratio of a detected object region and dynamically set a detection mode (such as a "human detection mode") corresponding to the identification result.

<4-3. Modified Example 3>

In addition, according to the above described embodiment, it is also possible to provide a computer program for causing a hardware such as CPU, ROM, and RAM to execute functions equivalent to the video shrinking unit 102, the region setting unit 104, and the video cropping units 106 described above. Moreover, it may be possible to provide a recording medium having the computer program stored therein.

Additionally, the present technology may also be configured as below.

(1)

An image processing device including:

an object detection unit configured to detect an object in a first image; and a cutout region deciding unit configured to decide, as a cutout region, a region positioned in a relative direction based on a position at which the object is detected in the first image, the relative direction varying depending on a detection condition.

(2)

The image processing device according to (1), in which the detection condition is associated with a type of a detection target object.

(3)

The image processing device according to (2), in which the type of the detection target object includes a human and an automobile.

(4)

The image processing device according to (3), in which, in the case where the detection target object is a human, the cutout region deciding unit decides, as the cutout region, a region positioned in an upper direction relative to a position at which the human is detected in the first image.

(5)
The image processing device according to (3) or (4),
in which, in the case where the detection target object is an automobile, the cutout region deciding unit decides, as the cutout region, a region positioned in a lower direction relative to a position at which the automobile is detected in the first image.

(6)
The image processing device according to any one of (3) to (5),
in which the cutout region deciding unit decides the cutout region such that a position obtained by moving the position at which the object is detected in the first image in a relative direction that varies depending on the type of the object is put on the center of the cutout region.

(7)
The image processing device according to any one of (3) to (6), in which
a size of the cutout region is decided in advance,
the image processing device further includes a detection region calculation unit configured to calculate a region size of a detected object, and
in the case where the region size calculated by the detection region calculation unit is larger than the size of the cutout region, the cutout region deciding unit decides, as the cutout region, a region positioned in a relative direction based on a position at which the object is detected in the first image, the relative direction varying depending on the type of the detection target object.

(8)
The image processing device according to (7), in which
the first image is a frame image in a moving image, and
the detection region calculation unit calculates the region size of the object in the first image on the basis of region sizes of the object calculated in a plurality of frame images before the first image.

(9)
The image processing device according to any one of (1) to (8), further including
a cutout image generation unit configured to generate a cutout image by cutting out the cutout region decided by the cutout region deciding unit from the first image.

(10)
The image processing device according to (9),
in which, in the case where a part of the cutout region decided by the cutout region deciding unit is out of the first image, the cutout image generation unit generates the cutout image such that the cutout image includes display showing the region out of the first image.

(11)
The image processing device according to (9),
in which, in the display showing the region out of the first image, the region out of the first image is filled with a predetermined color or a predetermined pattern.

(12)
The image processing device according to (10) or (11),
in which, in the display showing the region out of the first image, a predetermined character string is placed in the region out of the first image.

(13)
An image processing method including:
detecting an object in a first image; and
deciding, as a cutout region, a region positioned in a relative direction based on a position at which the object is detected in the first image, the relative direction varying depending on a detection condition.

(14)
An image processing system including:
an object detection unit configured to detect an object in a first image;
a cutout region deciding unit configured to decide, as a cutout region, a region positioned in a relative direction based on a position at which the object is detected in the first image, the relative direction varying depending on a detection condition;
a cutout image generation unit configured to generate a cutout image by cutting out the cutout region decided by the cutout region deciding unit from the first image; and
a storage unit configured to store the generated cutout image.

REFERENCE SIGNS LIST

10 camera
20 storage
22 monitoring terminal
24 communication network
100 image capturing unit
102 video shrinking unit
104 region setting unit
106 video cropping unit
108 communication unit
120 object detection unit
122 detection region calculation unit
124 cropping region deciding unit
220 control unit
222 communication unit
224 display unit
226 input unit

The invention claimed is:

1. An image processing device, comprising:
processing circuitry configured to:
detect a detection target object and a position of the detection target object in an image;
identify a first cutout region based on the position of the detection target object in the image;
determine whether a region size of the detection target object in the image is larger than a size of the first cutout region; and
in response to the region size of the detection target object in the image being determined to be larger than the size of the first cutout region, perform:
identifying a type of the detection target object;
determining a second cutout region according to the first cutout region, including, when the type of the detection target object is identified as a human type or an automobile type, determining the second cutout region by moving the first cutout region in a direction associated with the type of the detection target object for including a detection target of the detection target object in the second cutout region; and
generating a cutout image from the image according to the second cutout region.

2. The image processing device according to claim 1, wherein when the type of the detection target object is the human type, the processing circuitry is configured to determine the second cutout region by moving the first cutout region in an upper direction relative to the position of the detection target object.

3. The image processing device according to claim 1, wherein when the type of the detection target object is the automobile type, the processing circuitry is configured to determine the second cutout region by moving the first cutout region in a lower direction relative to the position of the detection target object.

4. The image processing device according to claim 1, wherein the detection target of the detection target object is located at the center of the second cutout region.

5. The image processing device according to claim 1, wherein
the image is one of a plurality of frame images of a moving image, and
the processing circuitry is further configured to calculate the region size of the detection target object in the image based on the detection target object in the plurality of frame images.

6. The image processing device according to claim 1, wherein when a part of the second cutout region is out of the image, the processing circuitry is further configured to generate the cutout image including a portion that corresponds to the part that is out of the image.

7. The image processing device according to claim 6, wherein the portion of the cutout image that corresponds to the part out of the image is filled with a predetermined color or a predetermined pattern.

8. The image processing device according to claim 6, wherein a predetermined character string is placed in the portion of the cutout image that corresponds to the part out of the image.

9. An image processing method, comprising:
detecting a detection target object and a position of the detection target object in an image;
identifying a first cutout region based on the position of the detection target object in the image;
determining whether a region size of the detection target object in the image is larger than a size of the first cutout region; and
in response to the region size of the detection target object in the image being determined to be larger than the size of the first cutout region, performing:
identifying a type of the detection target object;
determining a second cutout region according to the first cutout region, including, when the type of the detection target object is identified as a human type or an automobile type, determining the second cutout region by moving the first cutout region in a direction associated with the type of the detection target object for including a detection target of the detection target object in the second cutout region; and
generating a cutout image from the image according to the second cutout region.

10. An image processing system, comprising:
processing circuitry configured to:
detect a detection target object and a position of the detection target object in an image;
identify a first cutout region based on the position of the detection target object in the image;
determine whether a region size of the detection target object in the image is larger than a size of the first cutout region; and
in response to the region size of the detection target object in the image being determined to be larger than the size of the first cutout region, perform:
identifying a type of the detection target object;
determining a second cutout region according to the first cutout region, including, when the type of the detection target object is identified as a human type or an automobile type, determining the second cutout region by moving the first cutout region in a direction associated with the type of the detection target object for including a detection target of the detection target object in the second cutout region; and
generating a cutout image from the image according to the second cutout region; and
a memory coupled to the processing circuitry and configured to store the generated cutout image.

11. The image processing device according to claim 1, wherein the type of the detection target object is the human type and the detection target is a face of a human.

12. The image processing method according to claim 9, wherein the type of the detection target object is the human type and the detection target is a face of a human.

13. The image processing system according to claim 10, wherein the type of the detection target object is the human type and the detection target is a face of a human.

14. The image processing device according to claim 1, wherein the position of the detection target object is located at the center of the first cutout region.

15. The image processing device according to claim 1, wherein the processing circuitry is further configured to:
in response to the region size of the detection target object in the image being determined to be not larger than the size of the first cutout region,
generate the cutout image from the image according to the first cutout region.

* * * * *